United States Patent [19]

Fisher

[11] Patent Number: 4,878,232
[45] Date of Patent: Oct. 31, 1989

[54] DATA TRANSMISSION SYSTEM

[75] Inventor: David A. Fisher, Saffron Walden, Great Britain

[73] Assignee: STC PLC, London, England

[21] Appl. No.: 919,036

[22] Filed: Oct. 15, 1986

[30] Foreign Application Priority Data

Nov. 20, 1985 [GB] United Kingdom ............... 8526610

[51] Int. Cl.⁴ ........................... H04L 7/04; H04L 5/14
[52] U.S. Cl. ................................. 375/111; 370/32.1; 340/825.2
[58] Field of Search .................. 375/60, 99, 103, 111, 375/116; 340/825.05, 825.14, 825.2; 370/32, 32.1

[56] References Cited

U.S. PATENT DOCUMENTS 3,390,232 6/1968 Jager et al. .
4,766,589 8/1988 Fisher .................................... 370/32

FOREIGN PATENT DOCUMENTS 2029175 3/1980 United Kingdom .
2082025 2/1982 United Kingdom .
2161676 1/1986 United Kingdom .

Primary Examiner—Derek S. Jennings
Attorney, Agent, or Firm—Lee & Smith

[57] ABSTRACT

In a data transmission system data is sent, after suitable conversion, as a ternary analogue type signal. Using two-wire twisted pairs and hybrids, echo cancellation and feedback equalization are needed. Synchronization between the two ends, e.g. of a 144 Kb/sec. subscriber's loop, is maintained by a low amplitude pilot tone sent with the data, which is detected at the same time as the data is detected. Detection and elimination of this pilot tone use coefficient generation circuitry similar to those used in the equalizer and echo canceller. To reduce the effect of time phase steps on the system performance, in addition to the transmission of a specific zero valued frame synchronization word which immediately precedes the phase step, the incoming synchronization word is also aligned to this time so that the value of a symbol as received can be predicted, as for a synchronization word, the predicted value is given preference if there is a difference between that symbol's value as received and its predicted value. In addition, the location of the high-pass filters used in the system are specified, alternative methods of bit timing control are specified and advantageous realizations of the canceller and equalizer using tap interpolation are disclosed.

16 Claims, 10 Drawing Sheets

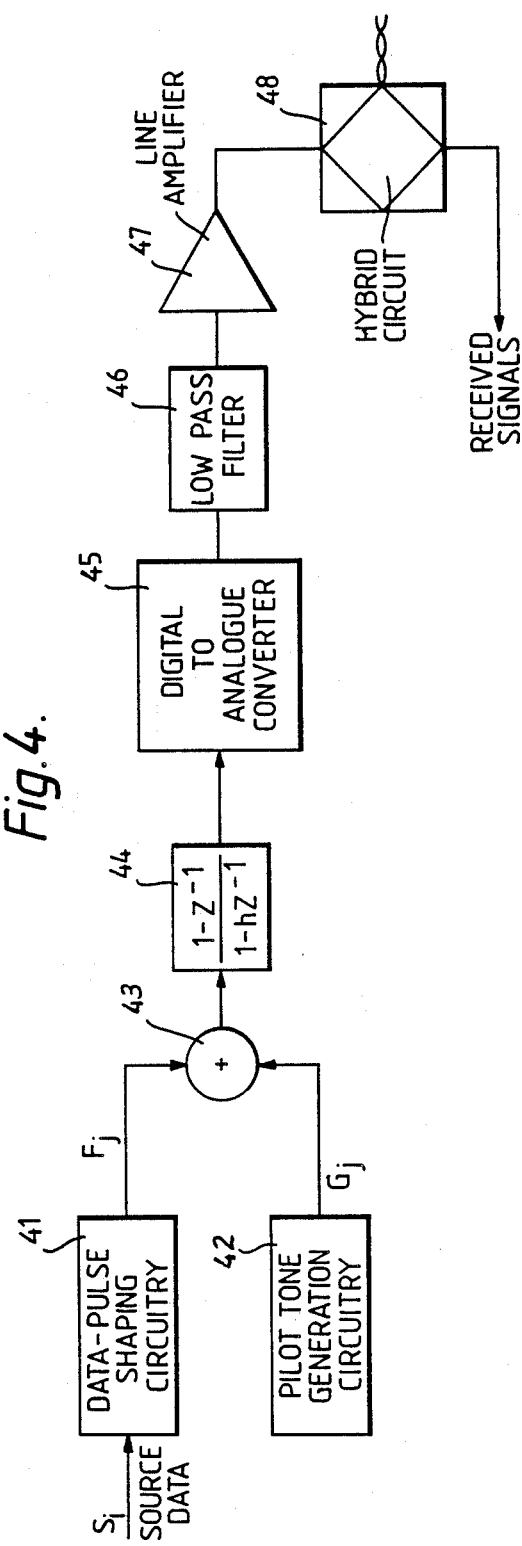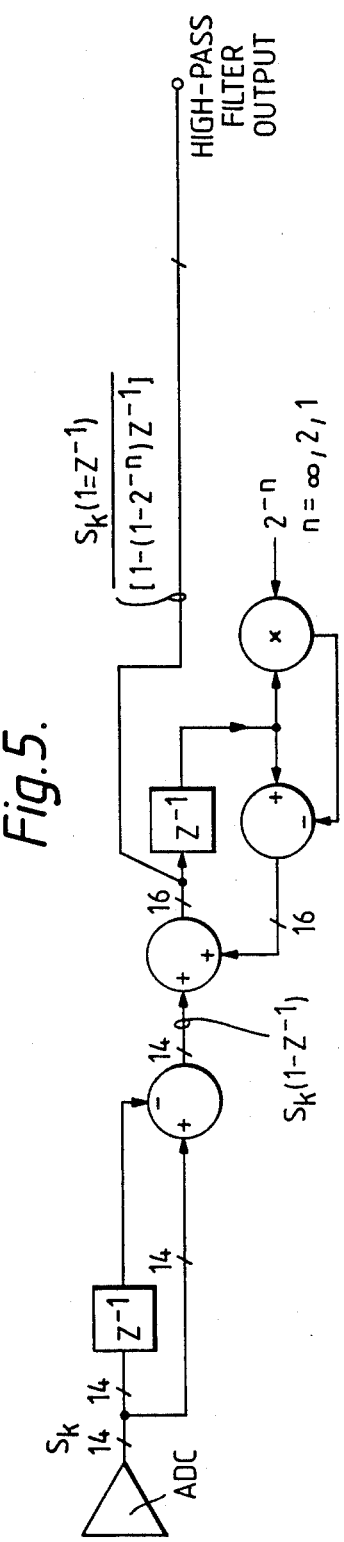
Fig. 4.
Fig. 5.

DATA TRANSMISSION SYSTEM

BACKGROUND OF THE INVENTION

This invention relates to a data transmission system, and is described herein as applied to a full duplex 144 Kb/s subscriber loop transmission system.

The present invention relates to an improvement of the invention of British Published Appln. No. 2161676A.

That application describes a data transmission system in which the data to be transmitted is in digital form, and is transmitted over the line in an analogue form. To maintain synchronization between the ends of the system a pilot tone is sent in addition to the data, this pilot tone having an amplitude which is small compared with that of the data signal. The pilot tone frequency has a fixed and known relation to the data bit rate, e.g. one-half of that bit rate. Thus the addition of the pilot tone does not increase the bandwidth. Sampling of the data signal is effected under the control of the local clock, and adjustment of that local clock is effected in response to the detected pilot tone. This detection occurs concurrently with the sampling and detection of the data signals, and the local clock is compared with the received and detected pilot tone, the timing of the local clock being adjusted in accordance with the results of that comparison to maintain synchronism.

SUMMARY OF THE INVENTION

An object of this invention is to provide improvements on the system of the above-mentioned Application.

According to the present invention there is provided a data transmission system in which the data to be transmitted is in digital form and each digital bit thereof is transmitted over the line in an analogue form, in which to maintain synchronization between the ends of the system a pilot tone is sent with the data, which pilot tone as transmitted is also in analogue form and has an amplitude which is small compared with the amplitude of the data signal, in which the pilot tone frequency has a fixed and known relation to the data bit rate, so that adding the pilot tone causes little or no increase in bandwidth, in which sampling of the data signal at the receiving end is under control of a local clock, adjustment of which is effected in response to the detected pilot tone, which detection is effected concurrently with that of the data signals, in which to effect said adjustments the local clock is compared with the received and detected pilot tone, the timing of the local clock being adjusted in accordance with the results of said comparison to maintain synchronization, and in which the receiving path at the receiving end includes in sequence a low-pass filter to which the received symbols are applied from a hybrid connected to the line, a sample and hold circuit which determines the values of the symbols and operates under the control of the local clock, an analogue-to-digital converter to which the output of said sample and hold circuit is applied, and a high-pass filter to the input of which is applied the output of the sample and hold circuit, the output of the high-pass filter being applied to one of the inputs of a subtractor to the other input of which is applied an input from an echo simulator.

BRIEF DESCRIPTION OF THE DRAWINGS

Embodiments of the invention will now be described with reference to the accompanying drawings, which show the application of the invention to a 144 Kb/s subscriber's loop. In these drawings:

FIG. 4 shows a modification to the arrangement of FIG. 1 so as to include a high-pass filter in the transmitter.

FIG. 5 shows a possible implementation of the high-pass filter of FIG. 4.

DESCRIPTION OF PREFERRED EMBODIMENTS

The system has two ends, the master end with a master oscillator which controls the PCM transmission rate, and a slave end synchronized to the master end by a clock synchronization circuit. Where the system is used for a telephone subscriber's loop, the master end is at a telephone exchange, usually as part of a subscriber's line circuit, while the slave end is at the subscriber's instrument. There are two modes of operation of such a system, training and steady state. The steady state mode is simpler and is described first.

During steady state operation, pilot tone transmission only occurs from master to slave and the master end sampling phase is fixed. The signal flow in this direction is described with reference to FIGS. 1 and 2 which show schematically the transmitter and slave receiver component parts of the echo cancelling transmission system. In the reverse slave to master direction the pilot is only used during training and the slave pilot transmission circuit and master pilot recovery circuits are inoperative.

Figure 1:
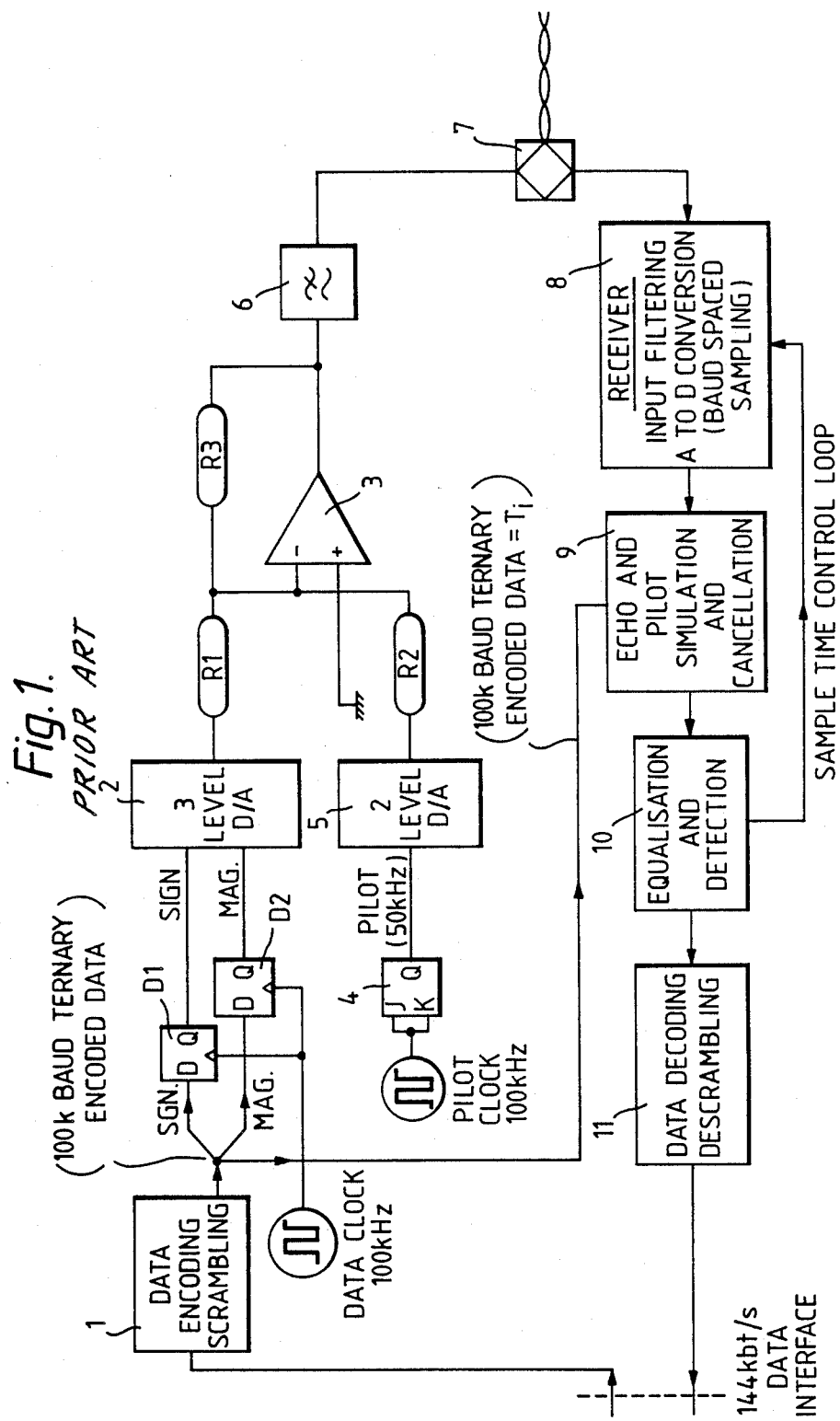
FIG. 1 is a simplified block diagram of the master station of the system of the above identified British Application, which includes details of pilot tone addition.

The transmitter circuit for the master station is shown in FIG. 1. In this case the data baud rate as transmitted is $f_o = 100$ kHz, and ternary non-return to zero pulse shaping is used. The relationship between the data clock of frequency $f_o = 100$ kHz and sample data is given in FIGS. 3A and 3B respectively. The code employed is 3B2T, as in U.S. Pat. No. 4,539,675 (D. A. Fisher), except that the synchronization word in the present case has five symbols occurring every 120 data symbols and is either 11110 or 11112, assuming the same symbol notation as in the patent specification just mentioned.

Figure 3:
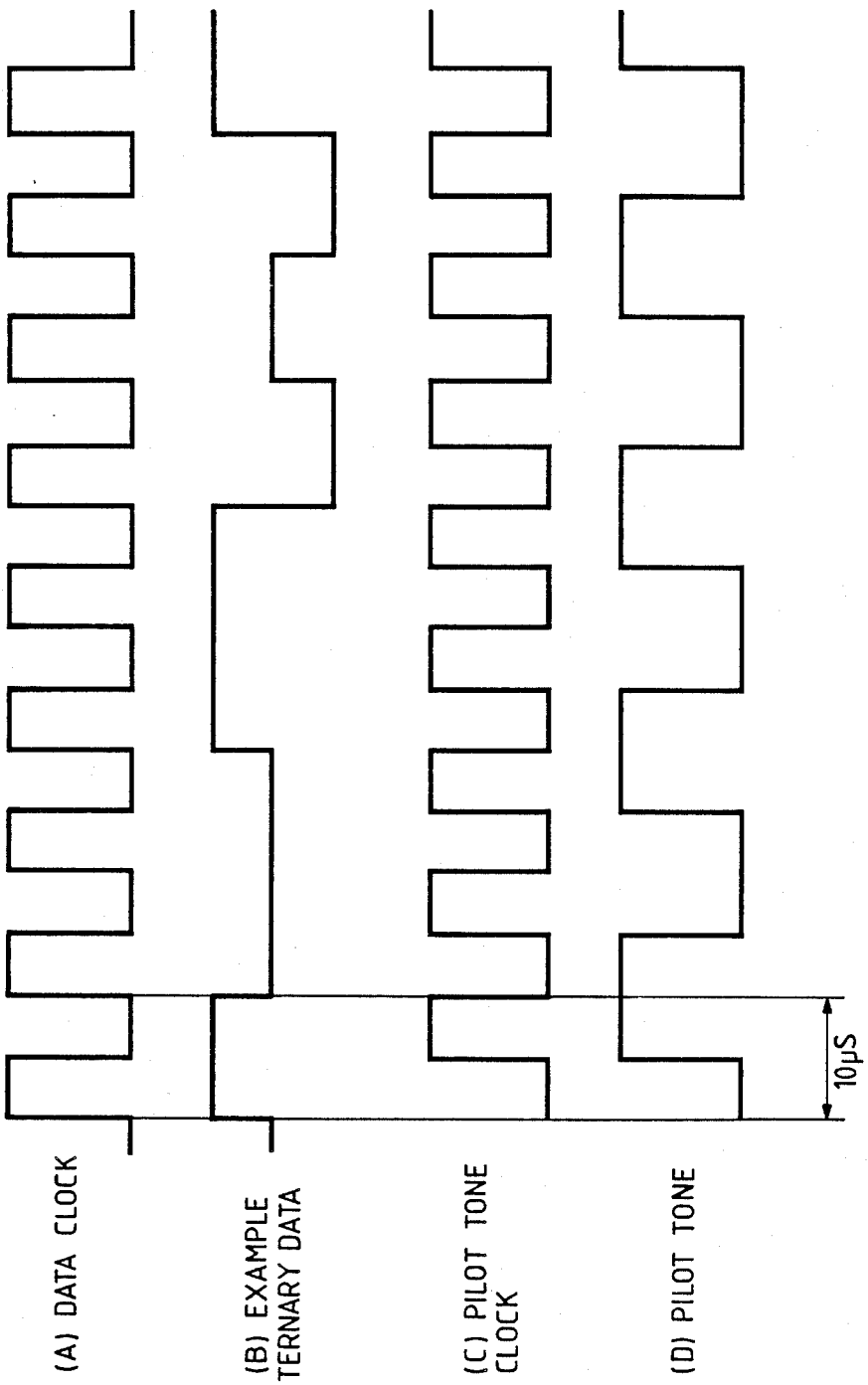
FIG. 3 is a waveform diagram showing the relation between data, data clock, pilot tone clock and pilot tone waveforms.

The pilot tone, FIG. 3D, is a squarewave of frequency $f_o/2 = 50$ kHz, and the phase relationship between the data and the pilot tone is such that transitions of the pilot each occurs at the mid-point of a data bit element. The pilot tone clock is shown in FIG. 3C and the pilot tone is produced by dividing the pilot tone clock by two. In general, the PCM data signal shape must have even symmetry, and at the point of addition the zero crossings of the $f_o/2$ pilot tone must coincide with the centres of the transmitted PCM signal shapes. In addition, the pilot tone must have odd symmetry about its zero crossing and must contain energy at the half symbol rate.

Addition of the pilot tone to the PCM data is done either in the analogue domain using an operational amplifier as in FIG. 1, or in the digital domain using for example, a twos complement number representation of the data signal and pilot amplitude.

The peak amplitude of the pilot tone is one quarter of that of the PCM data signal at the point of addition in the 144 kbt/s subscriber loop case. This ratio is not critical and is chosen to suit the parameters of the data receiver and data channel.

A low pass filter is placed between the pilot addition circuit and the line coupling circuit to control the transmitted data spectrum so as to limit interference. This low pass filter may be either a linear phase or minimum phase design with either analogue or digital implementation. With a digital implementation a digital to analogue converter is needed to generate the signal for transmission. The composite signal is then transmitted onto the cable via a linear resistive hybrid.

We now consider FIG. 1 in more detail. The incoming data signal is applied to a data encoding/scrambling arrangement 1 which eliminates auto-correlation in the transmitted data and cross-correlation between the two directions of transmission. The encoding produces an output in ternary form at 100K baud, which corresponds to 144 kb/s binary form plus frame synchronization. This output is applied to two data latches (D1) and (D2), one (D1) for data sign and the other (D2) for data magnitude. The outputs of these two latches control a three-level digital/analogue converter 2, the output of which passes via a resistor R1 to one input of an operational amplifier 3.

The pilot tone is derived from the pilot clock, which runs at 100 kHz (and is phase-locked thereto), via a divide-by-two circuit 4 the output of which goes to a two-level digital-to-analogue converter 5. The output of this converter 5 is applied via another resistor R2 to the amplifier 3, so that the pilot tone is added to the data signal. The combined signal is applied via a low pass filter 6 to a resistive hybrid 7, and therefrom to the line.

In the incoming direction the received signal is applied via the hybrid 7 to a receiver block 8. This includes input filtering, and analogue-to-digital conversion, with baud-spaced sampling whose control is described later.

The output of the block 8 goes to an echo and pilot simulation and cancellation block 9, which has a second input from the outgoing or GO path. This echo cancellation is needed because in practice the hybrid is imperfect and allows some break through of the GO signal to the receive side. This second input enables the breakthrough signal to be cancelled.

The output from the block 9 goes to the block 10, which provides equalization, and detection of the time at which sampling should be effected. The result of this detection controls the block 8 via the sample time control loop connection. The output from the block 10 goes to a data decoding and descrambling block 11 the output of which is the 144 Kb/s data.

The echo canceller operates as in U.S. Pat. No. 4,539,675 above. Here, however, the relation between the transmission clock and the receiver clock at the master end is frozen before the echo canceller is activated. This avoids the need for circuitry to cater for the cancellation discontinuity which occurs when the canceller data input clock and receiver sample cock cross over. The structure of the block 9 is modified to include an adaptive coefficient to eliminate the locally generated pilot tone. The method of adaption and the rate of adaption of this coefficient is as used for the other coefficients, and adapts the coefficient by an assessment proportional to the estimated gradient of the coefficient error.

This echo simulator generates a signal to be subtracted from the received signal, which signal corresponds to the transmitted signal. The simulator is an adaptive transversal filter having coefficients 1 to n and includes delay elements $Z^{-1}, Z^{-2}, \ldots Z^{-n}$, one for each of a number of previous bits. Each element feeds the combination of a first multiplier, an accumulater and a second multiplier. Each accumulator has a forward delay $Z^{-1}$.

The coefficient values are stored in the delay elements $(Z^{-1})$ a twos complement number, and are multiplied by the delayed data symbols using the second multipliers and summated in a summation circuit whose output goes to a subtractor. The subtractor output provides the canceller output sample to the equalizer. This sample is scaled by 1/C and correlated with the corresponding symbol values in the first multipliers and used to increment the coefficient values stored in the delay elements.

During steady state operation, the canceller only has to track small changes in the substantially time invariant transhybrid impulse response. In this case the established sign updating variant of the adaption algorithm is appropriate, whereby the coefficient value is incremented or decremented by its least significant bit dependent only on the sign of the first multiplier product. This reduces the coefficient accumulator to an up-down counter.

The locally generated pilot tone is cancelled by another coefficient generation circuit. This has its first multiplier "driven" by the output of the subtractor via the scaler, as for the other such circuits, but its other input to its multipliers comes from the local pilot tone. Thus the difference between this and the other coefficients is that the delayed transmitted data input to the multiplier is replaced by an input toggled at the pilot tone frequency of 50 KHz.

Figure 2:
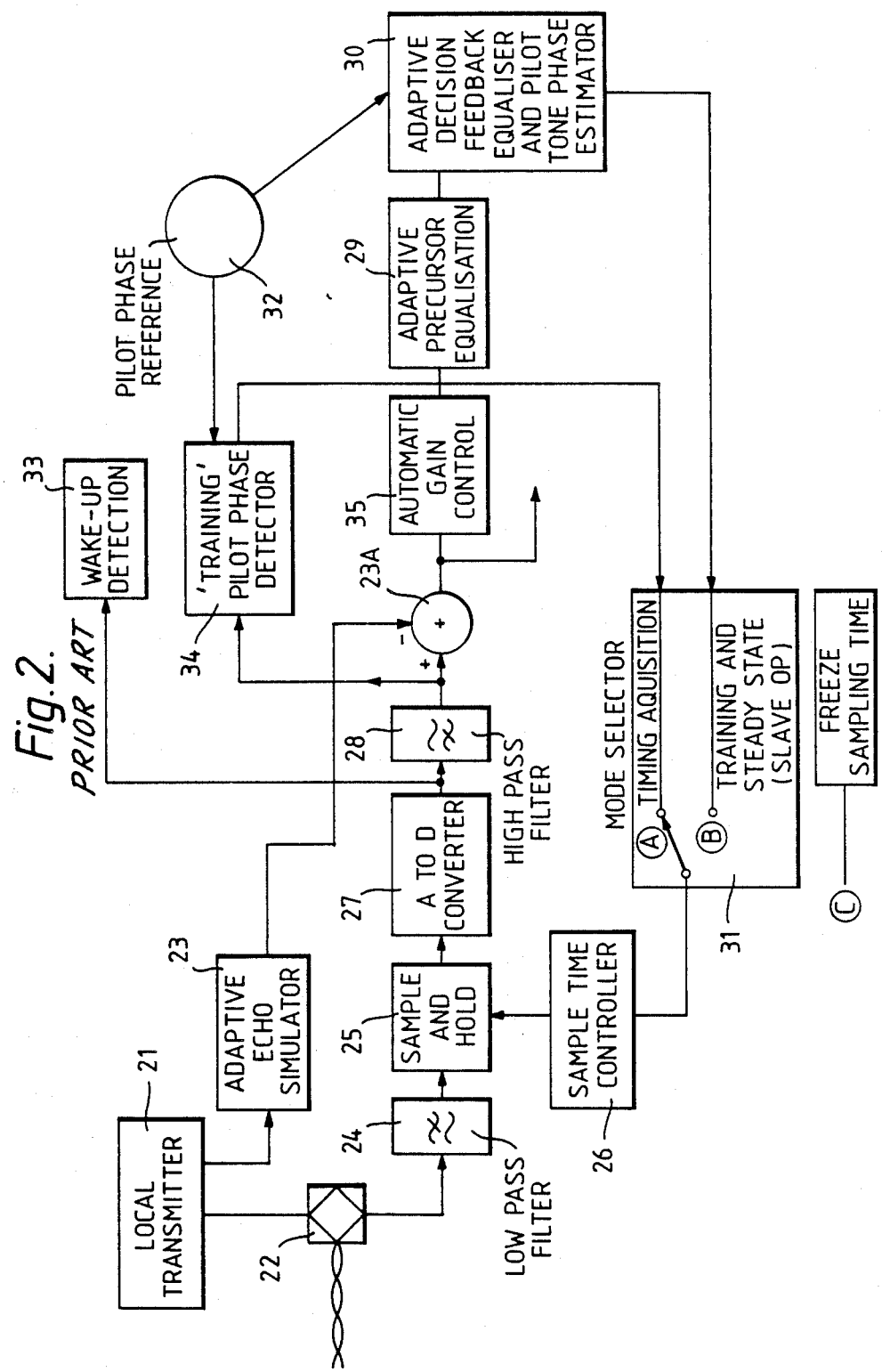
FIG. 2 is a simplified block diagram of the slave station of the system of the above identified British Application, to which the invention is applicable and which includes details of the pilot tone extraction method.

We now turn to FIG. 2, which includes more detail of the receive circuitry used at both stations. Here the local transmitter 21, from which data signals to be sent to the remote station come, is connected to the hybrid 22, and also for echo cancellation purposes to an adaptive echo simulator 23. The output of this goes to a subtractor 23A which subtracts the "simulated" version of the outgoing data from the incoming signal from the loop.

The incoming signal passes from the hybrid 22 via a low pass filter 24 to a sample and hold circuit 25, which samples each incoming data bit under control of a sample time controller 26. The output from the circuit 25 goes via an analogue-digital converter 27 and a high pass filter 28 to the subtractor 23A. The output of this goes to an automatic gain control circuit 35, whose output goes via an adaptive precursor equalization block 29 to a block 30. As will be seen, one improvement made by the present invention relates to the high-pass filter.

Block 30 is an adaptive decision feedback equalizer and pilot tone eliminator, and has an input from a pilot tone phase reference circuit 32. The output from the block 30 forms one input of a mode selector 31, which input is used during normal operation. During steady state operation at the slave station, the mode selector 31 connects the output of the block 30 to the sample time controller 26. Hence the block 30 controls the sampling times for the receive side of the slave end.

The receiver also includes a "wake-up" detection circuit 33, which responds to incoming signals, and is analogous to the conventional telephone bell.

The receiver also includes a "training" pilot phase detector 34, which determines incoming pilot tone phase from what the slave receives. This it does with reference to the local pilot phase reference 32, and the result of its detection is applied when in the training mode via the mode selector 31 to the controller 26. Hence this is effective when setting up the loop circuit.

The timing extraction circuit in the block 34 adjusts the time at which the composite received signal is sampled by the circuit 25, preceding the converter 27.

In the steady state mode data transmission and timing extraction have been set up in both directions. Data plus pilot tone passes from MASTER to SLAVE and data only from SLAVE to MASTER. The slave end sampling phase is determined by dividing the frequency generated by the slave end crystal oscillator (not shown), which in this case is 12.8 MHz, by 128 to give the 100 kHz. The slave end receiver sampling clock is always coincident with the slave end transmission clock.

The slave crystal oscillator frequency may drift with respect to the MASTER end oscillator, so to keep the clocks in synchronism it is necessary to periodically extend or reduce the time between the 100 kHz clock rising edges. Thus if the sampling phase has advanced relative to the incoming data the period between the clock cycles is extended to 129 cycles of the 12.8 MHz clock, while if the sample clock is retarded the period is reduced to 127 clock cycles. This extension or reduction is made following the sampled input which when processed by the slave echo canceller contains the first significant non-zero component of the transhybrid impulse response convolved with the final zero amplitude symbol of the frame synchronization word. The synchronization word is both unique and contains several consecutive zero symbols.

For those samples immediately following a simultaneous shift in the transmit and sample time at the slave end, the echo estimate made by the echo canceller is in error by the sum of the convolution of the transmitted data with the differential of the transhybrid impulse response with respect to the phase change. The first four terms in the differential of the transhybrid impulse response contribute much of the error, and can be removed by the cessation of transmission for a short period by sending zero amplitude symbols. A synchronization word containing four consecutive zero amplitude symbols which occurs every 125 symbols is selected as it is well matched to the 144 kbt/s subscriber loop application with phase shifts of 1/128 symbol periods.

The direction of adjustment of sampling phase is determined by whether at the sampling point the pilot tone zero crossing precedes or follows the sampling point. The timing extraction adjusts the position at which the signal is sampled to the point at which the pilot tone waveform crosses zero.

We now consider the start-up and training mode briefly. It is first necessary to "wake up" the system and to synchronize the two ends so that a known program of simplex transmission bursts may be used whereby each end knows when to transmit and when to receive.

This "wake up" signalling can use simple transmitted tones and be detected by tuned threshold comparison. One implementation uses a wake up signal using repetition of the sequence $++--$. This is detected by feeding the A to D converter output through a filter of response $(1-Z^{-2})$ then summing the resultant output over 8 input samples after which the sum is compared with a threshold. "Wake up" is valid if four consecutive summations exceed this threshold.

The slave end start up sequence control is started from the time at which the wake up signal summation drops below the "wake up" threshold. For slave end call initiation an identical "wake up" signal is transmitted in the slave to master direction and the same detection technique used. The slave end then waits for a return master to slave "wake up" signal for synchronization, see above. After "wake up", a pilot tone is transmitted from master to slave end for 512 symbol periods. At the slave end adjustment of the sampling phase is made, taking one phase step of amplitude 1/32 symbol periods every 16th symbol. The pilot is then transmitted by the slave to the master end for the same duration. The master end thus adjusts its sampling time in an identical manner to the slave and then locks this phase value relative to its transmission phase.

A second cycle of adjustment may then be used in which the pilot tone is transmitted for 512 symbol times each way in succession with phase steps of 1/128 to fine tune the timing. Thus rapid phase acquisition occurs, which at the exchange end needs no further adjustment for the remainder of that connection.

There then follows a training period in which one burst of data is sent each way simplex. Training data plus pilot is transmitted from master to slave and during this period the master canceller is trained with the slave equalizer and slave timing extraction operated. Without the remote signal, canceller coefficient perturbation is reduced and the scaler determining the canceller adaption rate (1/C) can be increased to a high value for example 1/256. Simultaneously the slave equalizer receives the data signal and pilot and the equalizer coefficient adaption is enabled following a period for AGC stabilisation.

The direction of binary data transmission is then reversed, but the pilot remains in the master-slave direction and the slave equalizer continues to enable adaption of its pilot tap whilst always making decisions of value zero thus disabling its other coefficients. Thus timing extraction is maintained in the master slave direction controlled by the pilot coefficient sign as defined previously. Adaption of the slave end canceller and master end equalizer is then enabled for the same duration as the previous training burst Perturbation of the slave canceller coefficients due to the presence of the remote but low level pilot has no significant effect on their accuracy.

Following these two simplex periods steady state full duplex operation with multi-level codes can commence. The canceller adaption is enabled at a much slower rate using for example the sign only adaption algorithm.

The master station end circuitry and the slave station circuitry can each be implemented in integrated circuit form, when it may be desirable for a "standard" chip to be used which involves the circuit elements common to both the master and the slave station.

We now discuss the modifications to the arrangements provided by this invention. These relate to a number of aspects. The first is an improvement in the use of the synchronization words at the subscriber end, which doubles the effective length of the word in relation to its ability to suppress the transient echo canceller error due to a small step in the sampling time of the A-to-D converter. The second aspect relates to the definition and position of the high pass filter, block 28, FIG. 2. This performs three functions, (a) DC offset elimination, (b) shortening of the tail of the pulse response and (c) filtering the received signal and noise components. Further, it may be at the transmitter or receiver or divided therebetween, so that sensitivity to noise, the amplitude distribution of the transmitted signal and the frequency spectrum of the transmitted signal can be modified to suit the specific operating environment.

The third addition is an improved way in which the pilot coefficient is used as a phase discriminator to control the digital phase-locked loop. The fourth addition is an alternative arrangement for providing for improved control of the digital phase-locked loop driven from the pilot coefficient. The fifth addition is an alternative to the use of the pilot coefficient for control of the digital phase-locked loop, which avoids use of the pilot after training and is applicable to master or slave ends of the system. It is essentially a variation of the tracking method described in U.S. Pat. No. 4,539,675, but using the pilot to initially locate the tracking point. The sixth addition is an alternative structure for the adaptive filter coefficients used for the echo canceller and equalizer, which reduces the volume of circuitry needed to provide for a similar degree of echo cancellation or equalization by the interpolation of taps used to represent the decaying tail of the transhybrid or transmission impulse response.

We first consider the first of these aspects. In a system as described, echo cancellation is used, whereby the transhybrid signal components of a known data sequence being sent to the far end of a cable are removed from the received data signal by subtraction. This is done numerically using logic circuitry. The transmitted data is superimposed on the received data as in the transmission scheme described above and in U.S. Pat. No. 4,539,675.

At the subscriber end the echo canceller consists of an adaptive transversal filter, i.e. the echo simulator, block 23 of FIG. 2, into which the source data is input. This takes one input for every transmitted data symbol and produces at its output the convolution of the data sequence and the adaptive filter coefficients.

There is a parallel signal path (the transhybrid path) whereby the data symbols to be transmitted are shaped and converted to a continuous signal using a digital-to-analogue converter and transmitted onto the cable through a hybrid. This hybrid also simultaneously receives the signal from the exchange end, which signal is then converted to a sampled data signal by circuits equivalent to a low pass filter, sample and hold circuit and A-to-D converter. The output from the converter is 12 bit digital words at a frequency equal to the nominal symbol rate of the exchange end transmitter.

Before 'echo cancellation' the signal passes through a high pass filter of the form $(1-Z^{-1})/(1-kZ^{-1})$ where $Z^{-1}$ represents a one symbol period delay. This filter is described in more detail below, and preferred values of k are 0.5 or 0.75.

The components of the unwanted local signal estimated by the echo simulator are subtracted from the output of the high pass filter, this being echo cancellation. All unwanted interference due to the transmitted signal is removed, if the coefficients of the echo simulator match the pulse response of the transhybrid signal path. However, as the crystal oscillator at the slave has a small frequency offset with respect to the master oscillator, to keep the clocks in synchronism, a digital phase locked loop may be used. In this case a symbol period clock used to select the sampling time and transmitter time is made by dividing the slave/subscriber crystal frequency by a nominal divisor, 128 in this case. This number of cycles is extended or reduced by one according to the sampling time control circuitry to maintain the slave sampling in track with the master transmitted data.

The first echo simulator estimate following a simultaneous time shift in the transmitter clock and sampling time clock at the slave end, will be in error by the convolution of the data sequence sent to the cable immediately prior to the time shift with the differential of the transhybrid pulse response over the time shift. Calculation shows that with a time shift of 1/128 symbol periods, this interference can cause occasional errors to the received data with a cable pulse attenuation of 30 dB. The interference thus generated decreases with successive data periods because data symbols transmitted following the phase step have the same relationship to the new A-to-D sampling time as existed before the phase step. Only the relationship between data symbols transmitted before the phase step and the A-to-D sampling time after the phase step has changed.

This problem is overcome by changing the sampling time only after the transmission of a sequence of zero elements. This zero valued data is a word also used for frame synchronization. Clearly a similar result could be obtained if the line code was one in which strings of zero valued data symbols occur.

An additional immunity to the effect of the noise remaining due to a phase step in the receiver sampling time and transmitter clock may be realised by additionally aligning this change with the reception of the first zero of the synchronization word being received. The burst of noise due to a step in sample time depends on the differential of the transhybrid response over the step increment convolved with the data being transmitted. Thus a great deal of this noise may be eliminated as described by aligning the transmission of a sequence of zero elements in the form of synchronization words with the phase step. However, with too short a sequence of zeroes some noise component may remain due to the phase step, the amplitude of which depends on the data sequence which for the 3B2T code defined is scrambled and so random. Thus there is a small possibility with a minimum length synchronization word that this noise occasionally exceeds a threshold sufficient to cause an error in the detection of a data element. However, if the data element being received is known or predictable with a high degree of certainty, as for the synchronization word, an error introduced occasionally into the reception thereof can be detected, but over-ridden in terms of the decision fed back into the decision feedback equalizer. It is thus prevented from propagating further errors due to the decision feedback process. The correct detection of a synchronization word in the correct location in the data sequence is used to increment a 'confidence count' in the frame synch. verification circuitry. An error event detected as described decrements the 'confidence counter' so that if this counter is at zero, the location of the synch. word is considered lost, and a search mode commences. If the counter exceeds 4 synchronization is considered to be verified. An upper limit of 63 is set on the counter value, which value is not critical but selected to match the time constants of the system.

The equalizer's ability to detect a decision that would have been incorrect due to a fore-knowledge of the location of the synchronization word in the data sequence, and so a count of correct versus incorrectly received synchronization words, can still be maintained to ensure confidence in the position of the synchronization word despite its use to prevent error propagation.

This technique is applicable only to the slave end where phase steps occur simultaneously with the transmitter clock and the receiver sample time. It is also advantageous to initially defer attempting to qualify frame synchronization at the master end of the system for a brief period at the start of ternary transmission because one has to shift the position of the synchronization word transmitted from the slave to align it with the correct position of the received synchronization word after having started transmission without this knowledge in a random position. Alternatively, synchronization can be achieved prior to ternary transmission by introducing signals into the binary training sequences or by deferring the transmission of ternary in the slave to master direction until the slave achieves frame synchronization.

Note that the technique can also be used at the master end to over-rule a burst of errors that might occur while receiving the synchronization word and thus help to prevent error extension in the decision feedback equalizer, this being known.

We now consider the definition and location of the high-pass digital filter with respect to FIG. 4. After the data to be transmitted is encoded as described, it is fed into a pulse shaping circuit 41. This circuit behaves as a finite impulse response filter acting at a rate N times the symbol rate excited by symbols of width 1/N symbol periods of amplitude +1,0 or −1. In the simplest case this filter produces a rectangular pulse one symbol period wide. However to control the transmitted signal spectrum a more complex pulse shaping circuit is used. This generates for an isolated '1' a pulse with even symmetry and typically with a spectrum which (after replicated side band removal) is constrained between DC and a frequency exceeding the half baud rate of the data but in general below a quarter of the sampling frequency of the pulse shaping filter.

The pilot tone generation circuit 42 produces a tone which in the simplest case is a continuous series of alternating data elements +1, −1, whose transitions occur in the centre of the even symmetric data pulses. This could be filtered as in FIG. 1. Alternatively in a digital implementation, the pilot tone can be generated as a series of discrete samples closely matching a pure sine wave.

We now consider with reference to FIG. 4 a simple implementation of the transmitter side, which differs from that of FIG. 1. Here the source data $S_i$ is applied via pulse-shaping circuitry 41 to one input of an adder 43 to the other input of which is applied the output of a pilot tone generation circuit 42. The output of the adder is applied via a filter 44, of characteristics $(1-Z^{-1})/(1-hZ^{-1})$, which feeds a digital-analogue converter 45, whose output is applied via a low-pass filter 46, a line amplifier 47, and hybrid 48 to the line. Although FIG. 4 shows a high-pass filter 44 in the simplest case such a filter may be omitted, as in FIG. 1. When the filter is not used at the transmitter, the series of data values from the adder is fed directly to the D-to-A converter. Such a filter can, however, be used as shown in FIG. 4 to alter the properties of the transmitted signal. This will be described in more detail in combination with the description of the high-pass filter in the receiver.

Figure 6:
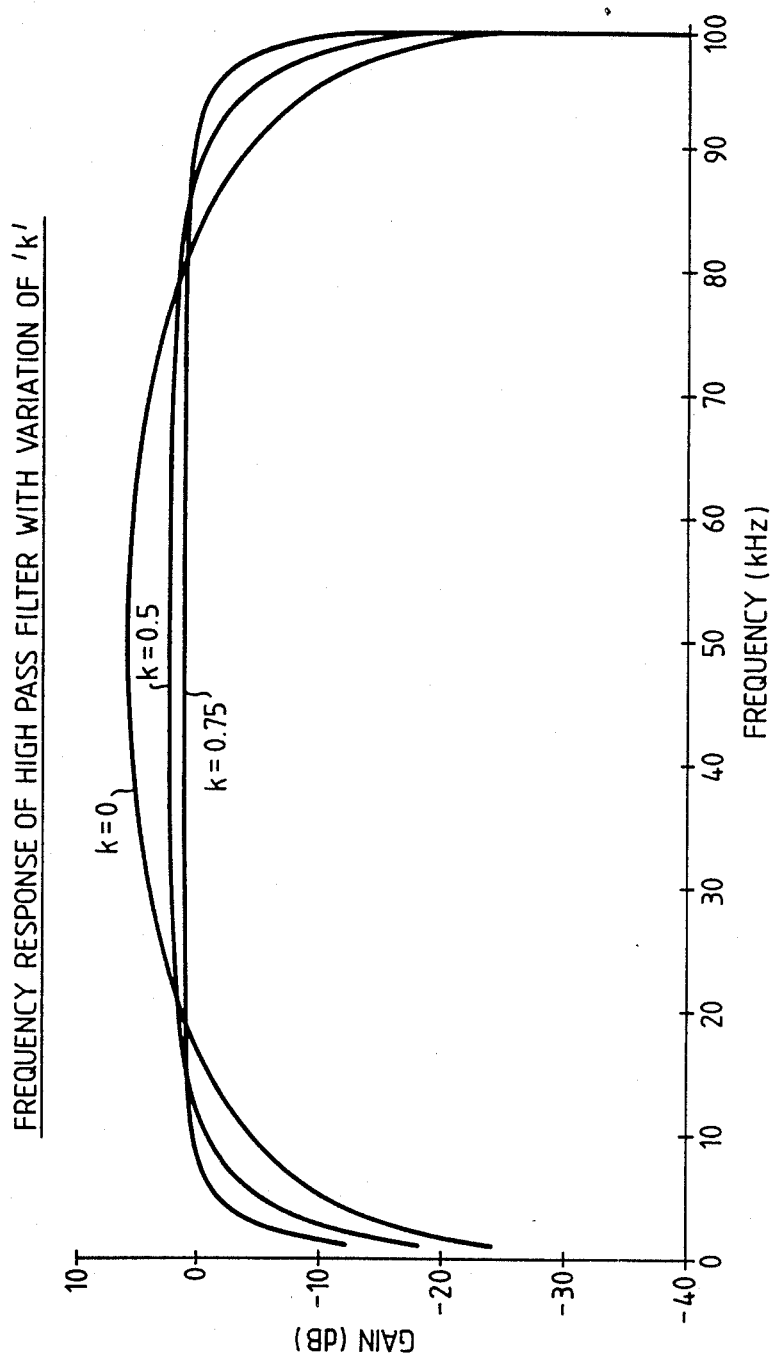
FIG. 6 is an explanatory graph, which is referred to later.

In the simplest form of the system, the digital high pass filter is only included in the receiver path, block 28 in FIG. 2. This filter is of the form $(1-Z^{-1})/(1-kZ^{-1})$ where $Z^1$ represents a one symbol period delay. The filter may be realised as shown in FIG. 5 using two delays each storing one word of data. The first circuit achieves the numerator function which is a differentiation over one symbol period of the received data. The second circuit performs the denominator function, a lossy integration of the output from the differentiator. The frequency response of the filter for values of k=0, ½, ¾ is given in FIG. 6. For $0 \leq k < 1$, the filter eliminates from the received signal any DC component due to analogue-to-digital conversion and/or arithmetic truncation. A further important purpose of this filter is to increase the rate at which the tail of a transmitted pulse decreases, and so to reduce the number of taps in the echo canceller and equalizer.

With the value of k=0, the filter is as in U.S. Pat. No. 4,539,675 above, and the length of the echo canceller and equalizer is maximally reduced. There is a cost due to the increased sensitivity of the receiver to high frequency noise sources and near end crosstalk from like systems, The value of k which provides significant reduction in pulse length at a lower cost to performance is k=0.5 or 0.75.

The filter in the receiver may also be in the transmission path. In this case the receiver filter has a very long time constant. With the transmit filter having coefficient h=½, and the receiver filter having coefficient k=63/64 the overall pulse response at the output of the receiver high pass filter is similar to that obtained when only a receive filter of coefficient k=0.5 is used.

The advantage of locating this filter at the transmitter depends on the noise environment on the cable and the signal characteristics required on the cable. The peak excursion of the signal at the analogue-to-digital converter input compared to the amplitude of the epoch of the pulse being received from a similar remote transmitter is an important parameter. This is closely related to the crest factor of the received signal which is defined as the peak to RMS ratio of the waveform.

With filter coefficient h=1 at the transmitter, the transmitted symbol is a dipulse and the code spectrum becomes equivalent to the well known code Alternate Mark Inversion and has identical properties. The crest factor of the signal at the A-to-D input is approximately 6 dB lower than for the unfiltered random ternary signal for the same size amplitude of the pulse epoch. With filter coefficient h=0.5 at the transmitter, low frequency components of the code are also considerably reduced and the crest factor of the transmitted signal will be reduced by approximately 3 dB compared to the case with unfiltered random ternary data.

The high pass filter can be split equally between the transmitter and receiver, with h=k=¾ as the filter coefficient to provide some reduction of the transmitter crest factor, whilst maintaining a degree of low frequency interference rejection at the receiver.

We now consider the use of the pilot tone coefficient to control timing extraction. Our above-quoted British Application No. 2161676A disclosed a technique whereby a pilot coefficient is introduced into the equalizer to act as a phase discriminator having an amplitude which increases with the timing offset from the ideal sampling instant. In that application, only the sign of the pilot coefficient was used at intervals defined by the frequency of the frame synchronization word, and the sampling time of the A to D converter stepped backwards or forwards by 1/128th of a symbol period.

An improvement in the accuracy of control and a reduction in phase jitter results by using a second order control whereby the phase step is proportional to the phase error estimated by the amplitude of the pilot coefficient. This however would introduce complexity. A significant improvement over the basic scheme can be obtained with only a small complexity penalty by one of the two following methods:

(i) A phase step is only taken if the value of the pilot coefficient goes beyond the range −P to +P at the time for the phase step. The step size is fixed as before at +1/128 of a symbol period. It is advantageous to reset the pilot coefficient to zero when a step is taken.

(ii) An accumulator is placed on the output from the pilot coefficient. Only if this accumulator goes beyond the range +A to −A at the time for the phase step is a step taken, in which case the accumulator is reset and the phase step direction corresponds to the sign of the accumulator.

We now consider an alternative to the use of the pilot tone once the system has been trained which enables the tone to be removed after training and/or provides for phase tracking at the exchange (master) end of the system. The procedure is as follows.

The training procedure specified in our above-quoted British Application No. 2161676A is followed up to the point where duplex transmission is due to commence. At this point the subscriber end timing will be tracking the exchange using the pilot tone and the exchange end timing will be locked to the sampling instant, this having been located by the simplex pilot tone sequence at the start of training.

Figure 7:
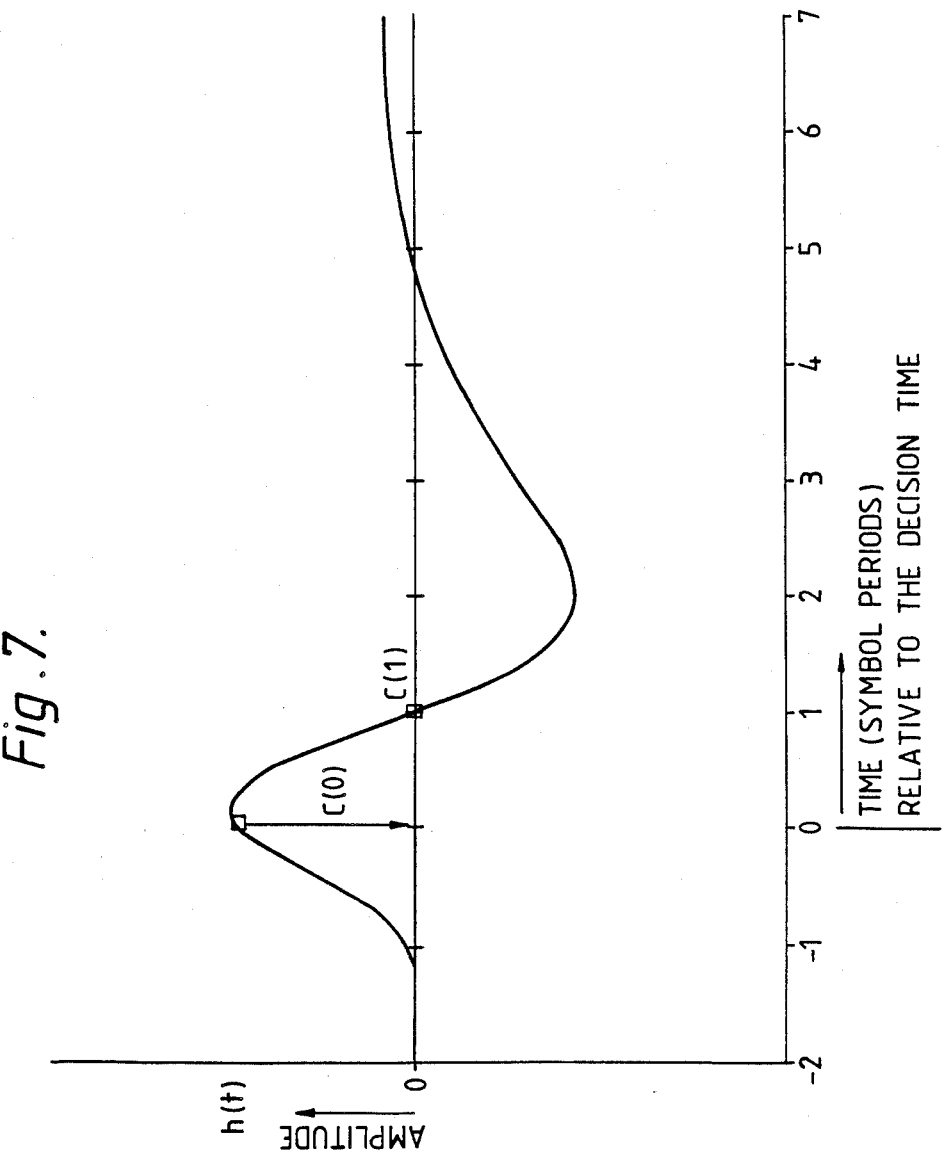
FIG. 7 is a plot of the transmission symbol response seen at the equalizer input.

The first post-cursor C(1) is then stored in a 12 bit register as a "reference" value. The sampling time of the A to D converter is then adjusted to maintain the value of the post-cursor coefficient at this "reference" value under the conditions of full duplex data transmission. Thus if the post-cursor coefficient C(1) exceeds the reference, the sampling time is advanced, and if the post-cursor coefficient becomes more negative the sampling time is retarded. This technique may be applied at both ends of the system and has much similarity with the techniques described in U.S. Pat. No. 4,539,675, except that the value of the coefficient maintained by the timing is not preset from the outset, but determined from the value corresponding to the pilot tone zero crossing located during the training period. The assumption made is that the symbol response of the transmission channel is of the form given in FIG. 7 with a substantially monotonic decrease in the region one symbol after the epoc of the pulse.

Implementation requires that the post-cursor coefficient be subtracted from the reference using for example 2's complement logic and that the value of this difference be used to control whether a step occurs and the step size and direction by the same techniques already described for controlling timing from the pilot coefficient directly.

We now describe a method of reducing the number of components needed in the echo canceller or equalizer to estimate the tail of the impulse response with as few components as possible.

It has been proposed that the use of a high-pass filter after the A to D converter or in the transmitter leads to a useful reduction in the number of taps required in the echo canceller for a given level of cancellation. The following defines why this is so and describes an alternative method to the use of the high-pass filter using tap interpolation on the tail of the impulse response The transhybrid response only is referred to in the following text but the techniques are equally applicable in the equaliser.

Let the impulse response h(t) of the hybrid response be defined at discrete time intervals T corresponding to a symbol period.

$$h(t = 0) = h(0) \quad h(t = T) = h(1) \quad \ldots \quad h(t = nt) = h(n)$$

Then if this response is high-pass filtered following A to D conversion by subtracting one sample from the next using the filter $1-Z^{-1}$ the hybrid impulse response after the filter becomes h(0), h(1)−h(0), h(2)−h(1), ... h(n)−h(n−1).

Let there by M canceller taps k(0), k(1), k(2) ... k(M−1) and if we assume the taps to be adapted to match the corresponding hybrid response, the uncancelled error remaining due to the finite number of taps will at worst be the sum of magnitudes of the pulse response at the sampling instants from time t=m to ∞. Without the high pass filter this will be:

$$\sum_{n=m}^{n=\infty} |h(n)|$$

With the filter these remainder terms become $$\sum_{n=m}^{n=\infty} |h(n) - h(n-1)|$$

If the impulse response after M symbol periods is substantially a decaying exponential, then the difference terms will be less than the unfiltered terms, and thus when the filter is used the number of taps can be reduced for a given degree of tail cancellation.

Figure 8:
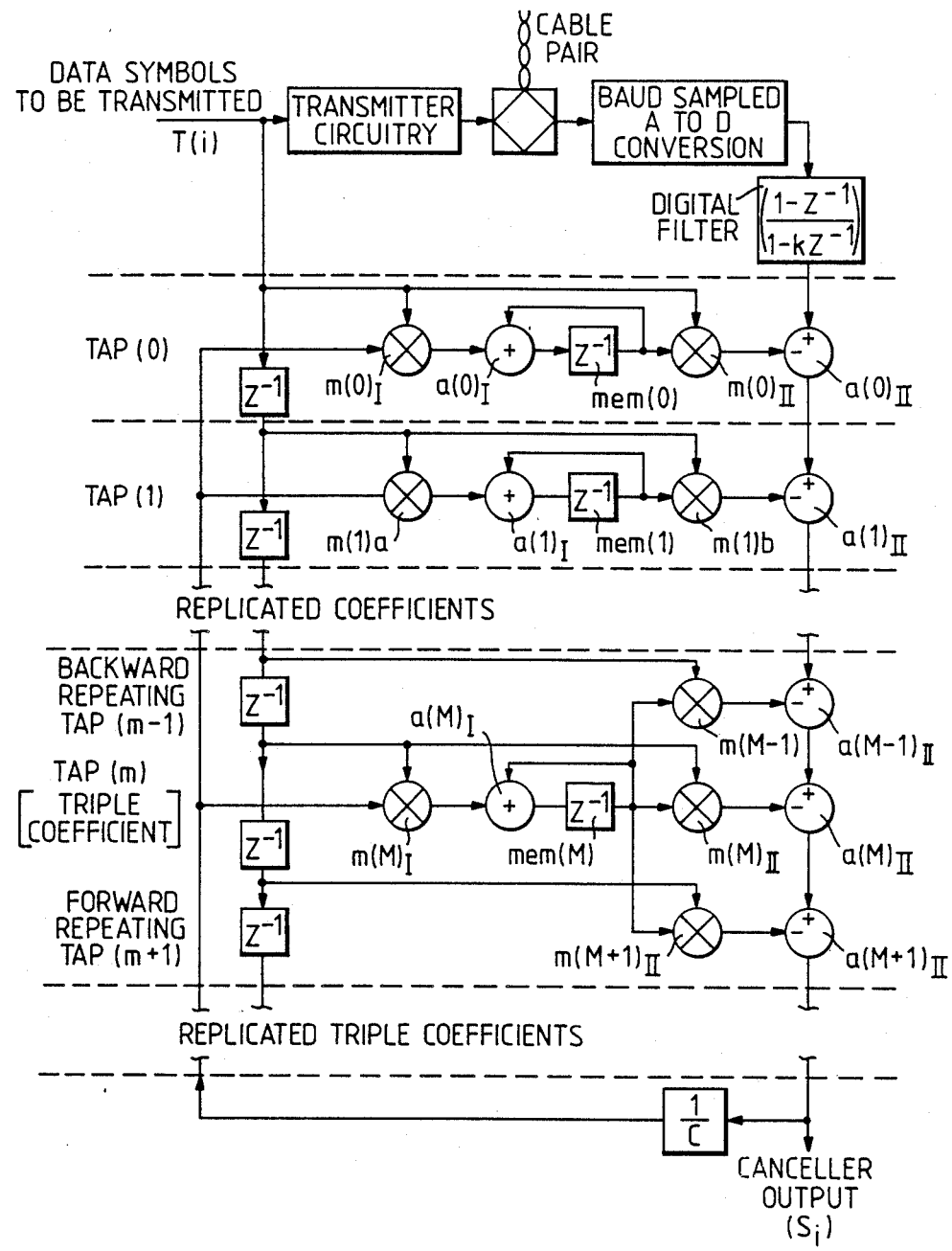
FIG. 8 an implementation of the echo canceller using 'triple' coefficients incorporating interpolation.

The use of the high pass filter gives rise to a reduction in the number of taps required because tap truncation leads to uncancelled terms in the transhybrid response consisting of symbol spaced difference terms of the tail of the transhybrid response An alternative to the filter is therefore an echo cancelling structure that leads to similar difference terms. Such a structure is shown in FIG. 8. For the purposes of this explanation consider the digital filter notionally eliminated by the value of k being set to one.

Two types of coefficient are shown, taps 0 to (M−2) have standard form. Tap (M) also has standard form but the value of tap (M) is also used for evaluation of the convolution sum in place of having separate adaptive taps for time (M−1) and (M+1). Thus the taps (M−1) and (M+1) are interpolated from tap (M) and consequently a multiplier, an adder and a coefficient memory are saved in each case. This combination of a conventional adaptive tap and two interpolated taps (a "triple tap") is then repeated until the uncancelled terms in the transhybrid response become negligible.

Thus with M−1 conventional taps (0 to M−2) and X triple taps, the canceller error due to interpolation is of the form:

| | | |
|---|---|---|
| h(M) − h(M − 1), | h(M) − h(M + 1) | for the first triple tap. |
| h(M + 3) − h(M + 2), | h(M + 3) − h(M + 4) | for the second triple tap. |
| h(M + 6) − h(M + 5), | h(M + 6) − h(M + 7) | for the third triple tap. |

With random data of value +−1 or 0 the worst case sum of canceller error due to interpolation and truncation with X triple taps and M−1 conventional taps will be:

$$\sum_{n=M}^{n=M+3X-1} |h(n) - h(n-1)| +$$

$$|h(n) - h(n+1)| + \sum_{n=M+3X}^{n=\infty} |h(n)|$$

The left hand term is the sum of symbol spaced difference terms of the transhybrid response omitting every third difference and is thus smaller than the case with the differentiating filter described above. Sufficient triple taps would in practice be used to cause the right hand term to be negligible.

An example of practical application of such a structure would be where the high-pass filter is retained with a value of the denominator coefficient k=0.5. The number of conventional taps M=20 and the use of triple taps X=8. Thus the triple tap section replaces conventional taps 20 to 44.

Figure 9:
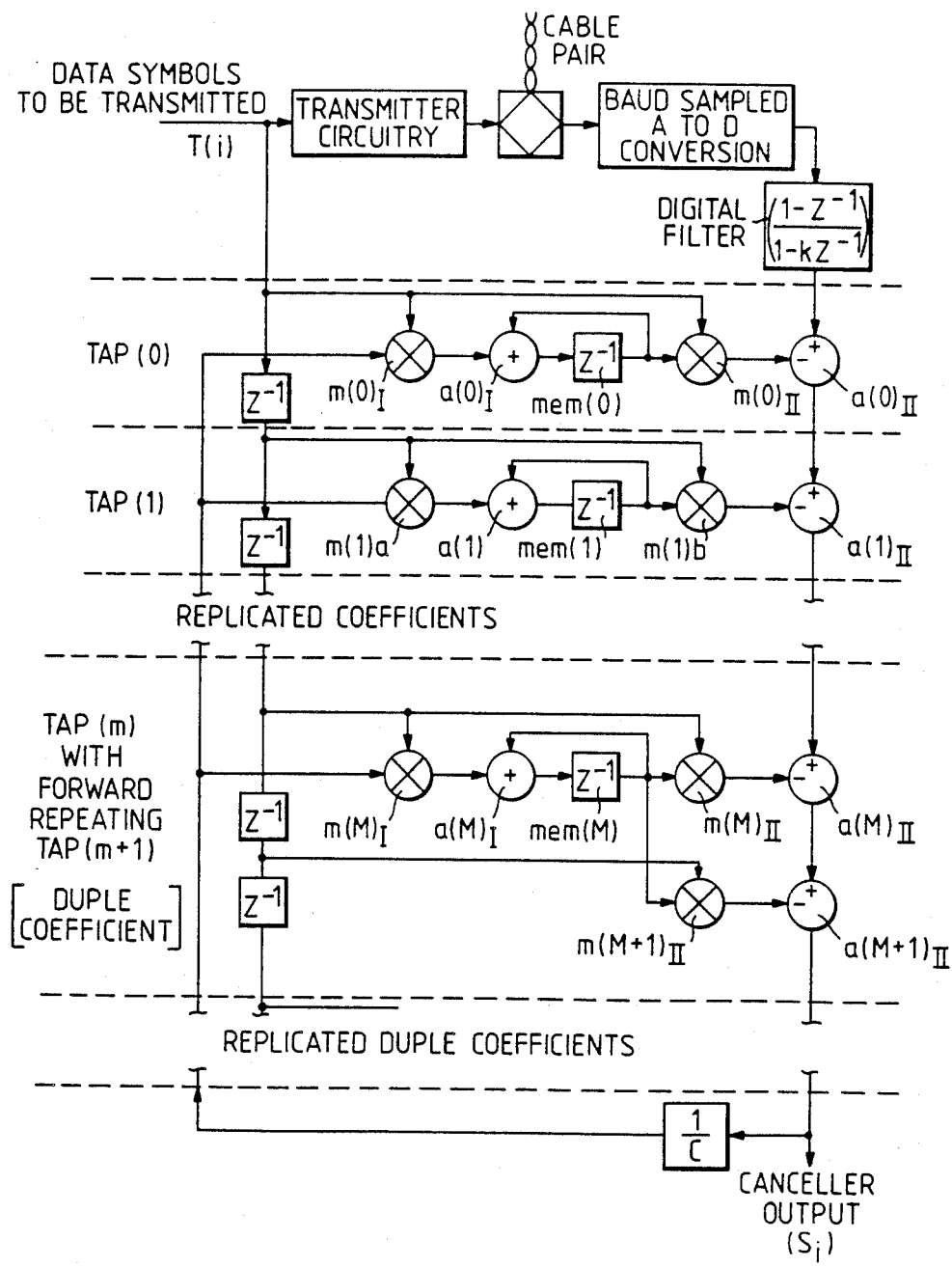
FIG. 9 is an implementation of the echo canceller using 'duple' coefficients incorporating interpolation.

FIG. 9 shows an arrangement which is similar to that of FIG. 8, but using "duple" coefficients in place of the triple coefficients of FIG. 8. It functions in a similar manner to FIG. 8.

Further structures of this type giving similar results are also possible. FIG. 9 has a structure where the same tap is used as the basis for interpolation of the following tap thus requiring more circuitry than the triple tap structure but giving residual terms as below eliminating every second difference from the residual error. With M standard adaptive taps and Y duple taps the worst case canceller error due to interpolation and truncation is:

$$\sum_{n=M}^{n=M+2Y-1} |h(n) - h(n-1)| + \sum_{n=M+2Y}^{n=\infty} |h(n)|$$

Figure 10:
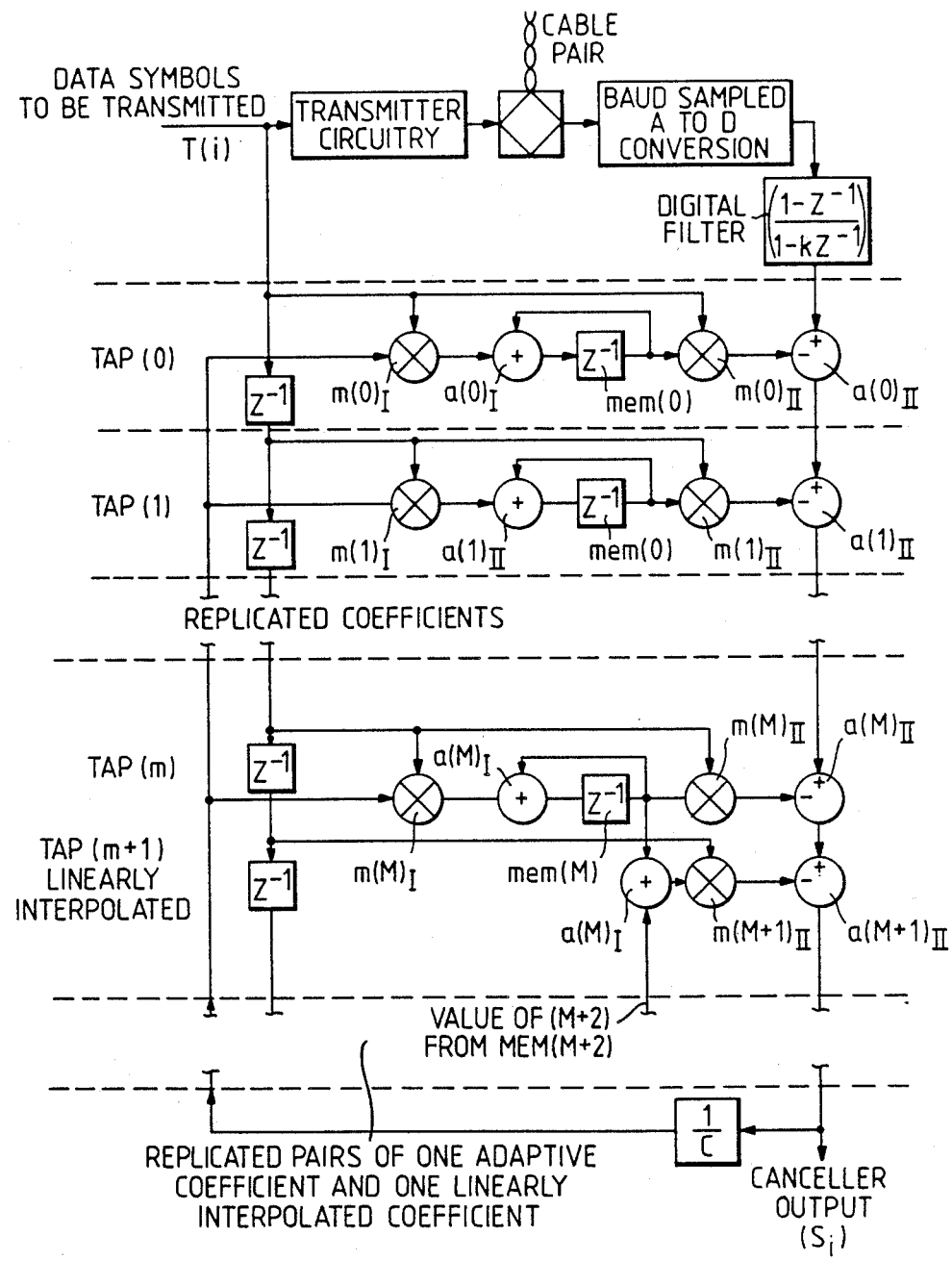
FIG. 10 is an implementation of the echo canceller using linearly interpolated coefficients.
Figure 11:
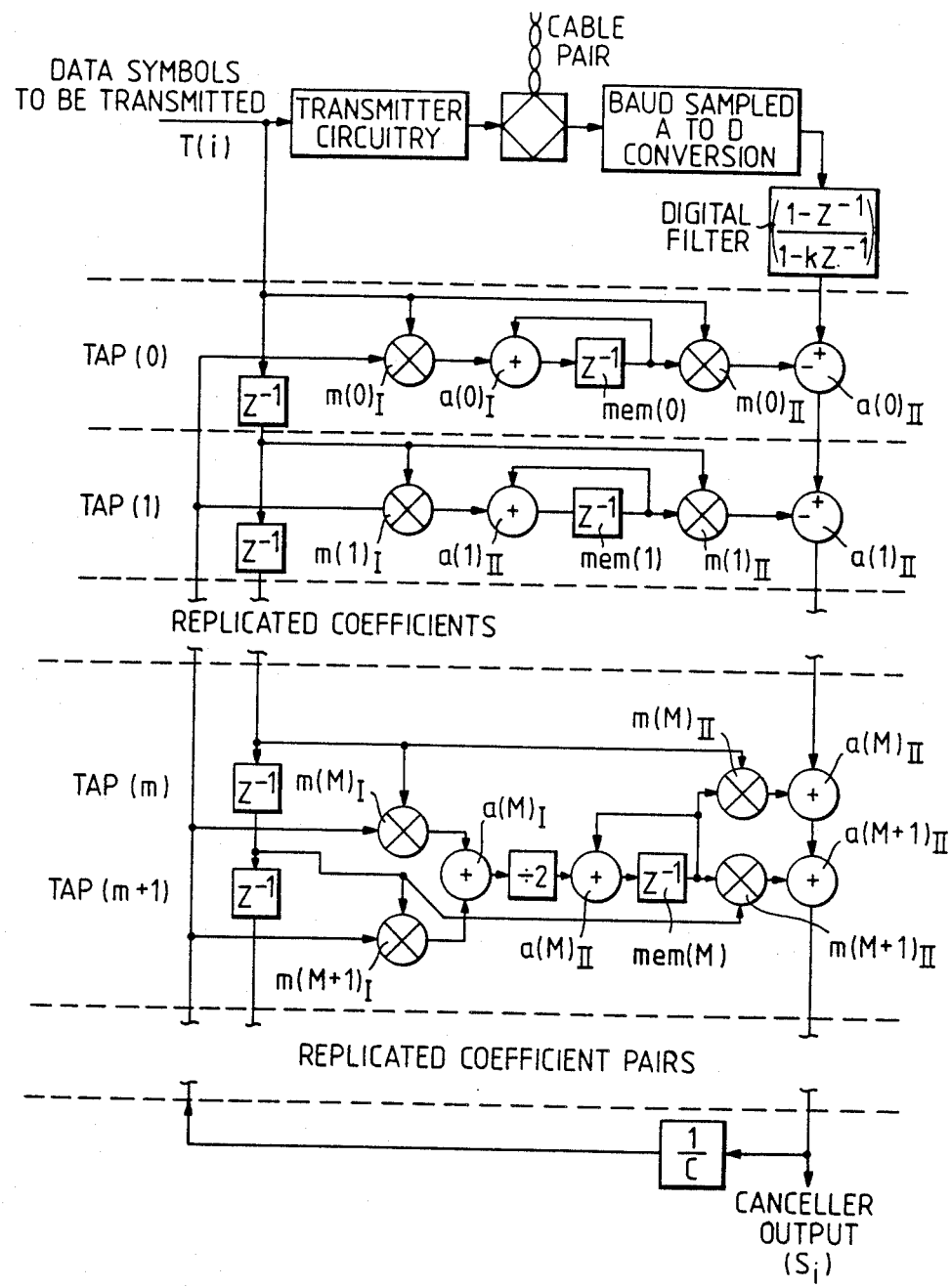
FIG. 11 is an implementation of the echo canceller where the coefficient value is adapted to the mean value of two adjacent sampling instants.

Further alternatives giving higher accuracy are:
(i) Interpolate the value of even numbered taps after the mth tap by addition of the two odd taps either side and division by two. $k(i)=K(i-1)+k(i+1)$ for i even only. (FIG. 10).
(ii) After the mth tap use the same tap value for even and odd delays and adapt the tap value depending on the sum of the adjacent data values. The tap adapts to a value mid-way between the two ideal values such that $k(i)=k(1+1)=(h(i)+h(i+1))/2$. (FIG. 11).

I claim:
1. A method for maintaining synchronism between a master terminal and a slave terminal of a digital data transmission system in which data is transmitted over a line between the terminals in analogue form, which method includes:
sending from the master terminal to the slave terminal a pilot tone additional to the data, the amplitude of the pilot tone being small compared with that of the data signal, the pilot tone having a frequency with a fixed and known relation to the data bit rate, so that adding the pilot tone does not increase bandwidth;
sampling the data signal received at the slave terminal under the control of a local clock;
detecting the pilot tone at the slave terminal concurrently with the sampling of the data signals;
comparing the local clock with the detected pilot tone and adjusting the timing of the local clock in accordance with the results of said comparison to maintain synchronization between the slave terminal and the master terminal;
reducing error occurrence in the received data by comparing the value of a received data symbol whose value can be safely predicted, as in the case of a synchronization word, with what it should be, and over-riding the value as received if it differs from the predicted value, and when such an error is detected using said detection to decrement a confidence measure value in a synchronization location and verification circuit, said confidence measure value being incremented in response to the correct detection at the correct time location of the synchronization word;
and employing said error occurrence reduction operation to protect the slave terminal when a phase step by the local clock is taken in addition to the transmission of a specifically zero valued frame synchronization word, from the slave terminal immediately prior to the phase step occurring, and reduce the effect of time phase steps on system performance.

2. A method as claimed in claim 1 wherein said sampling includes the steps of applying the received data signal to a hybrid connected to the line, applying the output of the hybrid to a low pass filter, applying the output of the low pass filter to a sample and hold circuit which determines the values of the symbols and operates under the control of the local clock, applying the output of the sample and hold circuit to an analogue-to-digital converter, applying the output of the analogue-to-digital converter to a first high pass filter, applying the output of the first high pass filter to one of the inputs of a subtractor and applying an input from an echo simulator to the other input of the subtractor.

3. A method as claimed in claim 2 wherein at the transmitter side of a said terminal of the system the following steps are performed, namely;
applying the data and the pilot tone to respective inputs of an adder;
applying the outputs of the adder to a second high-pass filter;
applying the output of the second high-pass filter to a digital to analogue converter, and
applying the output of the digital to analogue converter to a respective hybrid connected to the line for transmission to the other terminal.

4. A method as claimed in claim 3, wherein the output of the digital to analogue converter is applied to the respective hybrid via a low-pass filter and a line amplifier.

5. A data transmission system which embodies the method of claim 3 in which the characteristics of said second high-pass filter are defined by the expression:

$$\frac{(1 - z^{-1})}{(1 - hz^{-1})}$$

6. A method as claimed in claim 1 wherein the adjustment of the local clock is made in a step manner, the direction of the adjustment being that appropriate to correct a detected discrepancy, and wherein said adjustment is only made if the value of a pilot tone coefficient in a pilot tone and decision feedback equalization circuit exceeds a present value.

7. A method as claimed in claim 6 and, only when a phase step is taken, including the step of resetting the pilot tone coefficient to zero.

8. A method as claimed in claim 1 including the use of an echo cancellation circuit in which a pilot tone coefficient is employed, and including the steps of connecting an accumulator to the output of the circuit which generates the pilot tone coefficient and adjusting the local clock only if the content of the accumulator exceeds a present value, and, in that case, resetting the accumulator to zero.

9. A method as claimed in claim 1, including the steps of establishing bit synchronism between the two terminals of the system on switch on, or in response to a loss of frame synchronization, by the execution of a training sequence during which said adjustment of the local clock is effected based on use of the pilot tone; terminating the transmission of the pilot tone when synchronism is attained and determining a coefficient for use in the slave terminal; and storing the coefficient in a memory for use as a reference for future maintenance of synchronization.

10. A method as claimed in claim 9 and in which the bit synchronism technique referred to is also used at the master terminal.

11. A method as claimed in claim 1, including the use of an echo canceller with a multiplicity of coefficients at each end of the system, and wherein a said canceller which includes a finite impulse response filter is used which models the transhybrid response as in the case of the canceller, or the transmission response as in the case of a decision feedback equalizer of the echo canceller, and includes coefficients which are derived by interpolation from adjacent coefficients which are adapted according to the gradient of the tap error.

12. A data transmission system which embodies the method of claim 1 in which each of said terminals is implemented in integrated circuit form.

13. A method for maintaining synchronism between the ends of a digital data transmission system in which data is transmitted over a line between the ends in analogue form, which method includes:
sending a pilot tone additional to the data, the amplitude of the pilot tone being small compared with that of the data signal, the pilot tone having a frequency with a fixed and known relation to the data bit rate, so that adding the pilot tone does not increase bandwidth:
sampling the received data signal under the control of a local clock;
detecting the pilot tone with the sampling of the data signals;
comparing the local clock with the detected pilot tone and adjusting the timing of the local clock in accordance with the results of said comparison to maintain synchronization between the ends of the system;
performing echo cancellation operations upon the received data signal in echo cancellation circuitry including a decision feedback equalizer, the pilot tone being employed in said equalizer;
and, if the value of a pilot tone coefficient in said equalizer exceeds a present value, adjusting the local clock in a step-by-step manner, with the direction of the adjustment being that appropriate to correct a detected discrepancy.

14. A method as claimed in claim 13 and, only when a phase step is taken, including the step of setting the pilot tone coefficient to zero.

15. A method as claimed in claim 13 including the step of connecting an accumulator to the output of the circuit which generates the pilot tone coefficient and adjusting the local clock only if the content of the clock exceeds a preset value and, in that case, resetting the accumulator to zero.

16. A data transmission system which embodies the method of claim 13, in which each of said terminals is implemented in integrated circuit form.

* * * * *